United States Patent Office 2,906,695
Patented Sept. 29, 1959

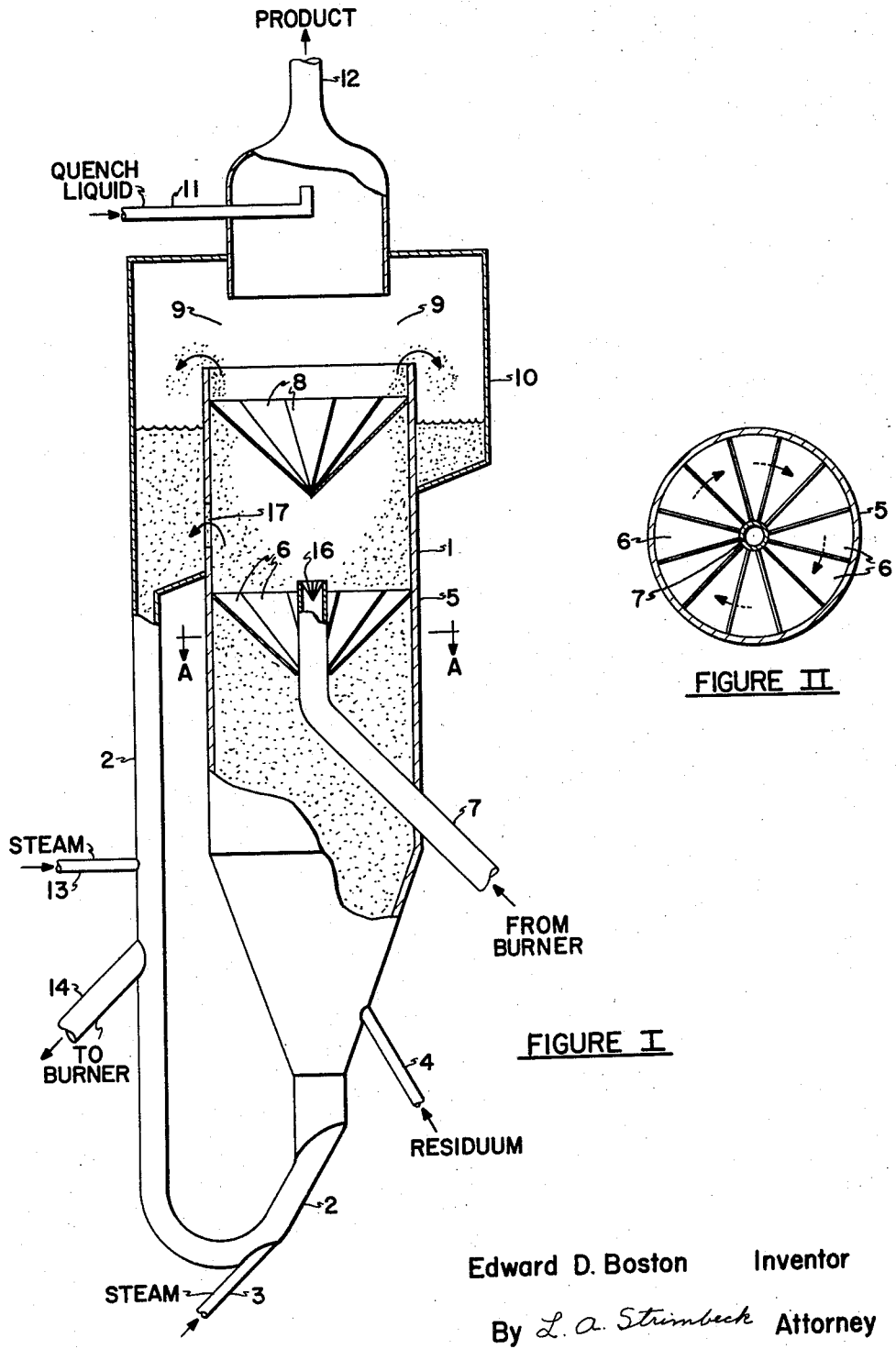

2,906,695

HIGH TEMPERATURE SHORT TIME HYDRO-CARBON CONVERSION PROCESS

Edward D. Boston, Westfield, N.J., assignor to Esso Research and Engineering Company, a corporation of Delaware Application August 7, 1956, Serial No. 602,549

4 Claims. (Cl. 208—127)

This invention relates to the high temperature conversion of organic materials using heated fluidized solids to produce chemicals and chemical intermediates. It is more particularly concerned with an apparatus and a method for pyrolytically converting heavy hydrocarbons, especially residual oils to unsaturated and aromatic compounds through contact with high temperature particulate solids.

In brief compass, this invention proposes an improvement of a hydrocarbon conversion process wherein a hydrocarbon feed is contacted with a stream of fluidized high temperature particulate solids directionally flowing through an elongated reaction zone, and converted to coke which is deposited on the solids, and to lighter conversion products. The improvement of this invention comprises first contacting the hydrocarbon feed with fluidized particulate solids at a temperature of 1000 to 1200° F. in the initial portion of an elongated reaction zone, flowing the resulting reaction mixture rapidly through the reaction zone, imparting a strong rotational motion to the mixture about the axis of flow, and immediately thereafter introducing into the central portion of the mixture highly heated particulate solids in an amount sufficient to bring the temperature of the mixture to 1250 to 1800° F. The heated particulate solids so introduced flow by centrifugal force in a rotating conical pattern to the periphery of the reaction zone because of the strong rotational motion imparted to the reaction mixture. The solids at the periphery of the zone are then removed and the vaporous products are rapidly cooled to arrest any further conversion by injecting a quench medium. After contacting and converting the hydrocarbon feed, the heat carrying solids are reheated, as by burning, and recycled.

It is known to convert hydrocarbon oils by contacting them with a flowing stream of solids having a temperature above about 1200° F. The solids supply heat for cracking or converting the feed material, and receive and remove from the reaction zone coke produced by the cracking reaction. In this manner, chemicals and chemical intermediates are produced such as unsaturated compounds like ethylene, propylene, butylene, butadiene and isoprene; and aromatics like benzene, toluene, and xylenes.

To obtain optimum conversion at these high temperatures, and to minimize secondary cracking to undesired materials such as coke and light gases, it is necessary to limit the residence time of the hydrocarbons at the conversion temperature in the conversion zone. The heat carrying solids must be rapidly separated, and the vaporous product must be immediately quenched and cooled. Residence times in the order of 0.01 to 1 second are normally desired.

From a practical standpoint, it is virtually impossible to obtain these extremely low residence times using conventional solids-gas separating systems such as cyclones. Also, because the total residence time of the vapors is so limited, it is very difficult to obtain proper feed distribution or good mixing between the injected feed, which is normally liquid, and the high temperature solids. Poor mixing results in non-homogeneous cracking, polymerization, and excessive coking.

In the present invention, these and other difficulties are overcome. A materially improved chemical coking process is obtained through use of a novel apparatus arrangement.

In the present invention, the hydrocarbon feed is first vaporized at a lower temperature than the conversion temperature by contact with rapidly flowing, heated, finely divided solids, in an initial portion of an elongated reaction zone. After allowing the necessary time for feed distribution and vaporization, the reaction mixture is given a strong rotational motion about its axis of flow, by means of fixed directing blades or spiral vanes. This rotation causes the solids to be thrown to the periphery of the reaction zone. Immediately after passing through the spiral vanes, the temperature of the reaction mixture is rapidly increased or jumped to that necessary for the desired conversion by injecting additional highly heated solids. Because of the rotational motion of the mixture, the added solids rapidly pass to the periphery of the circular reaction zone in a conical curtain or funnel-shaped stream. The vaporized hydrocarbons from the initial portion of the reaction zone rapidly pass through this curtain of solids, are rapidly heated, and undergo cracking to the desired products. The solids are removed from the periphery of the reaction zone and the substantially solids-free vaporous products in the central portion are immediately cooled to arrest further conversion.

The following description of the drawing attached to and forming a part of this specification, will serve to make this invention clear. Figure I, an elevation with parts in section, diagrammatically depicts one embodiment of the invention. Figure II, taken along the indicated section AA of Figure I, more clearly illustrates the fixed impeller or directing means used to impart rotational motion to the reaction mixture.

This process is best suited to the conversion of heavy hydrocarbon fractions containing constituents non-vaporizable at atmospheric pressure without cracking. It is especially suitable for the conversion of materials that produce large quantities of coke upon cracking, typified by materials having Conradson carbon contents of from 5 to 50 wt. percent, gravities of —10 to 20° A.P.I., and initial boiling points above 900° F. Atmospheric and vacuum residua from crude oils, catalytic cycle stocks, asphalts, tars, shale oils and extracts are examples of such materials. Broadly, however, this invention is also useful in converting lighter materials such as distillate gas oils, naphthas and whole crudes.

The solids used in this invention may be of any suitable refractory material such as sand, metal particles, ceramic particles, etc. In cases where the amount of coke produced is sufficient, it is preferred to use coke particles produced by the process. In some cases, it may be desired to use catalytic solids, such as porous silica-alumina. The solids have a size range that permits good fluidized operation. It is preferred to use larger size solids than is customary in fluidized processes in order to improve the efficiency of separation.

Referring to the drawing, solids, e.g., sand particles having a temperature of about 1250 to 1800° F., are admitted to the base of reaction zone 1 by line 2. The solids are conveyed in the reaction zone by steam admitted by line 3, although other gases may be used such as light hydrocarbons and inert gases, to avoid the water-gas reaction.

Reaction zone 1 comprises, in this case, a vertically disposed, elongated, suitably refractory lined chamber somewhat expanded in the upper portion.

The feed stock, e.g., a vacuum residuum from the distillation of a petroleum crude oil, e.g., a South Louisiana crude, is injected into the lower portion of reaction zone 1 by line 4, contacts the heated solids and undergoes vaporization. For convenience, the lower portion of the reaction zone is termed the vaporization zone; and the upper portion, starting with the impeller blades, is called the cracking zone, although some cracking and vaporization occurs in each zone.

The reaction mixture passes upwardly through reaction zone 1 and encounters fixed directing means or impeller blades 5, more fully shown in Figure II. This directing means may comprise, for example, a series of inclined and curved blades 6, radially placed as shown, in an intermediate portion of the reaction zone. This directing means causes the rapidly flowing reaction mixture to rapidly rotate about its axis of flow. This rotation causes the solids of the reaction mixture to be centrifugally forced to the outer confines or periphery of the zone. With the velocities customarily used and with the type and size of solids used, it is usually sufficient to impart a rotation of 60 to 600 radians per second to the reaction mixture.

Immediately after directing means 5, heated solids having a temperature of about 1300 to 2000° F. and having a linear velocity approximately that of the products from the first zone are introduced by line 7, which extends through the center of directing means 5, into the relatively solids-free central portion of the rotating reaction mixture. Because of the rotation, the solids fan or spread outwardly to the confines of the zone in a conical curtain or funnel-shaped pattern. Vanes 16 to give rotation to the hot solids can be, if desired, added near the outlet of line 7. The vaporized hydrocarbons from the vaporization zone pass into the cracking zone through this conical curtain, and are thereby rapidly heated to the necessary conversion temperature. In this manner, extremely rapid heating is obtained simultaneously with almost immediate separation, whereby the requisite short contact time is realized. The velocity of the vapors at this point is such that after having been heated to the cracking temperature, the vapors can be quenched in under preferably 0.5 second.

If desired, further rotation can be given to the reaction mixture by means of fixed directing means 8, similar to means 5. After this, the solids centrifugally forced to the walls of reaction zone 1 spill out or pass through suitable longitudinal or circumferential openings or slots 9, into a solids receiving chamber or receiver 10. Chamber 10 as shown is concentrically disposed about reactor 1. If desired, some of the solids can be transferred to receiver 10 by slots or opening 17 positioned somewhat lower on reactor 1 above directing means 5.

The substantially solids-free conversion products are immediately cooled by injection of a quench medium by line 11. Preferably, this comprises cooled hydrocarbon oil but can comprise other liquids such as water, cooled particulate solids or gases, as desired. The vaporous conversion products, having been cooled to a temperature that arrests any further conversions, are removed overhead by line 12. The desired chemical and/or chemical intermediates are recovered in a conventional manner as by fractionation, absorption and crystallization. Higher boiling material from the conversion products can be recycled.

The solids retained in receiver 10 have a temperature sufficient to be used directly in the vaporization zone. Thus, solids are withdrawn from receiver 10 and passed by line 2 to the inlet portion of the vaporization zone as previously described. Steam or other stripping gas can be admitted to line 2 as by line 13 if desired. Solids are withdrawn from line 2 by line 14 and passed to a reheating zone and raised to the necessary temperature. Solids are returned from the reheating zone to reaction vessel 1 by line 7.

The solids in line 14 can be heated by any conventional means such as gravitating bed burners and fluidized burners wherein the coke deposited on the solids is burned, or indirect heat exchange and the like. It is preferred, however, to use a transfer line burner known to those skilled in the art, because it is more efficient at these high temperatures. Extraneous gaseous liquid or solid fuels can be used to heat the solids.

The following table summarizes the range of pertinent operating conditions applicable to this invention, and presents a specific example thereof.

Table

|  | Preferred range | Example |
|---|---|---|
| Vaporization zone: |  |  |
| Average temperature, ° F | 1,000 to 1,200 | 1,050 |
| Solids flow rate, lbs./sec./sq. ft | 5 to 60 | 14 |
| Feed rate (for a residuum), lbs./lb. solid | 0.05 to 0.5 | 0.22 |
| Average vapor residence time, sec | 0.5 to 5 | 1 |
| Superficial gas velocity at zone outlet, ft./sec | 15 to 100 | 30 |
| Density of fluidized solids at outlet of zone, lbs./cu. ft | 0.1 to 2.0 | 0.47 |
| Steam, lb./lb. feed | 0.05 to 1.0 | 0.12 |
| Cracking zone: |  |  |
| Imparted rotation, radians/sec | 60 to 600 | 180 |
| Average temperature, ° F | 1,250 to 1,800 | 1,400 |
| Pressure at quench point, p.s.i.g | 0.5 to 20 | 5 |
| Temperature of added solids, ° F | 1,300 to 2,000 | 1,600 |
| Amount of added solids, lbs./lb. feed | 5 to 50 | 16 |
| Average vapor residence time before quench, ° F | 0.01 to 1.0 | 0.1 |
| Superficial gas velocity, ft./sec | 20 to 150 | 50 |
| Temperature of vaporous product after quench, ° F | 400 to 1,000 | 600 |
| Total $C_3$— conversion,[1] wt percent | 20 to 70 | 30 |
| Solids, size, microns: |  |  |
| 95% less than | 100 to 1,000 | 300 |
| 95% greater than | 50 to 800 | 100 |
| Average size | 50 to 900 | 175 |

[1] $C_3$— conversion is defined as 100 wt. percent fresh feed less products having more than 3 carbon atoms including coke.

Having described this invention, what is sought to be protected by Letters Patent is succinctly set forth in the following claims.

What is claimed is:

1. In a hydrocarbon conversion process wherein a heavy, hydrocarbon feed is contacted with a stream of high temperature particulate solids flowing upwardly through an elongated reaction zone and converted to coke which is deposited on said particulate solids and to light conversion products, the improvement which comprises mixing a heavy hydrocarbon feed with hot upflowing particulate solids in a vaporization zone forming the initial portion of said elongated reaction zone at a temperature in the range of about 1000° F. to 1200° F. to vaporize the heavy hydrocarbon feed, upwardly flowing the resulting mixture of vapors and solids rapidly through said vaporization zone, imparting a strong rotational motion to said mixture about the axis of flow at the outlet end only of said vaporization zone so that the gas has a superficial velocity in the range of about 15 to 100 feet per second to effect separation of solids at the outlet end of said vaporization zone, removing the separated solids, passing said upwardly moving and rotating vapors to a cracking zone arranged immediately above said vaporization zone, immediately thereafter introducing only into the central portion of said cracking zone additional hotter particulate solids as a conical curtain so that said upwardly moving and rotating vapors from said vaporization zone pass into said cracking zone through said conical curtain of solids and are rapidly heated thereby, said additional hotter solids being added in an amount sufficient to raise the temperature of said vapors to a cracking temperature within the range of about 1250° F. to 1800° F. in said cracking zone, said hotter particulate solids so introduced being moved by the centrifugal action of said vapors in a rotating conical pattern to the periphery of said cracking zone because of a strong rotational motion whereby a vapor residence time in the range of 0.01 to 1.0 second is obtained in said cracking zone, then separating the last-mentioned particulate solids from the vapors at the outlet of said cracking zone, removing said last-mentioned vapors upwardly, injecting a quench liquid into said last-mentioned vapors to lower the temperature thereof to below about 1000° F. and recovering the vapors so quenched.

2. A process according to claim 1 wherein an additional strong rotational movement is given to the vapors leaving said cracking zone to centrifugally remove solids therefrom.

3. A process according to claim 1 wherein the solids separated from vapors from said vaporization zone and the hotter solids separated from vapors from said cracking zone are combined in a receiving zone and form the hot upflowing particulate solids used for admixture with said heavy hydrocarbon feed in said vaporization zone.

4. A process according to claim 3 wherein part of the mixture of solids from said receiving zone is removed and passed to an external heater and the heated solids therefrom used as the hotter solids introduced into said cracking zone.

References Cited in the file of this patent

UNITED STATES PATENTS

| | | |
|---|---|---|
| 2,433,798 | Voorhees | Dec. 30, 1947 |
| 2,662,005 | Evans | Dec. 8, 1953 |
| 2,683,109 | Norris | July 6, 1954 |
| 2,732,331 | Wesh | Jan. 24, 1956 |
| 2,734,850 | Brown | Feb. 14, 1956 |
| 2,737,479 | Nicholson | Mar. 6, 1956 |
| 2,739,104 | Galbreath et al. | Mar. 20, 1956 |
| 2,759,880 | Brown | Aug. 21, 1956 |
| 2,766,186 | Nadro | Oct. 9, 1956 |